United States Patent Office 2,900,915
Patented Aug. 25, 1959

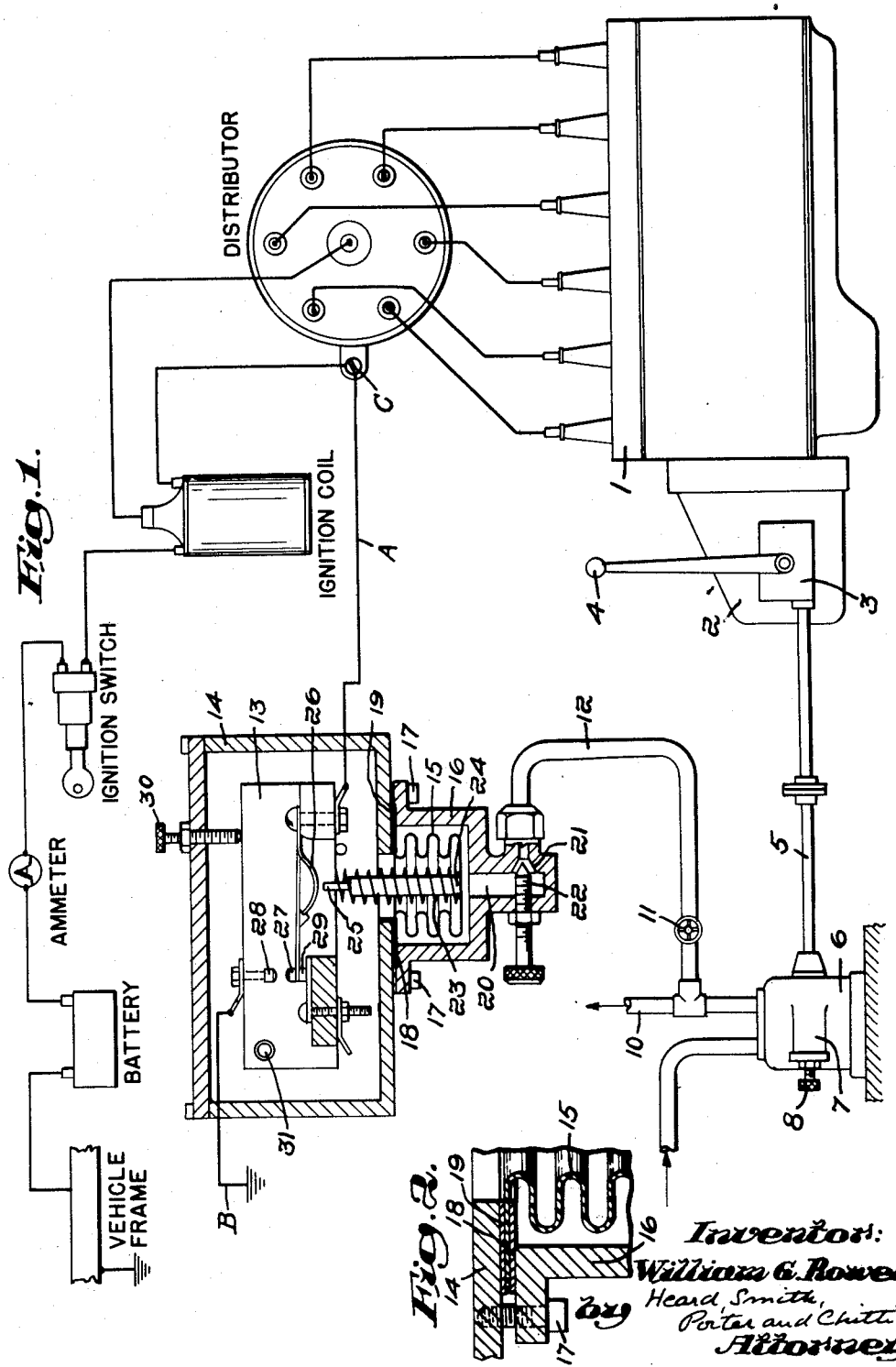

2,900,915

AUTOMATIC ENGINE CUT-OFF FOR PUMP-EQUIPPED TANK TRUCK VEHICLES

William G. Rowell, Quincy, Mass., assignor to Scully Signal Company, Melrose, Mass., a corporation of Massachusetts Application March 25, 1955, Serial No. 496,696

2 Claims. (Cl. 103—27)

This invention relates to an automatic engine cut-off and in particular to liquid delivery tank truck vehicles of the type which employ a power take-off mechanism driven by the engine and operating to drive a pump to deliver to the customer the product carried in the tank truck. In the ordinary case, the liquid will be fuel oil or gasoline but the invention works equally well in the delivery of other types of liquids.

A very considerable amount of difficulty has been encountered through the use of pump-equipped tank truck vehicles in respect to high pressures which can be destructive to the pumping equipment, caused from faulty operation of the equipment by the operator. This difficulty has been one of long standing and, indeed, well-recognized by those engaged in the tank truck fuel delivery art but while this problem is well-known, there is not a commercially available device that will provide a satisfactory solution.

The usual sequence of operations in the delivery of fuel from a tank truck vehicle is as follows: Upon reaching the delivery point the operator connects a hose, or other conduit means, between the discharge line of the vehicle pumping system and the customer's storage tank fill pipe. With the engine running, he then engages the power take-off mechanism to the pump, by operating a lever in the cab of the truck. He then adjusts the engine speed by positioning the hand throttle to a desirable pumping setting. Upon opening a control valve in the vehicle discharge line, the product will be pumped from the vehicle tank to the customer's tank. Upon completion of the delivery the operator closes the discharge valve, uncouples the hose from the customer's tank, returns to the cab and disengages the power take-off mechanism from the pump before he reels in the hose and drives away.

The pump commonly utilized in tank truck vehicles is of the so-called positive displacement type but improved forms of the centrifugal pump are gaining in popularity. These types of pumps can easily build up pressures sufficiently high to damage the equipment if rotated at excessive speeds, and the pump could well destroy itself by creating excessive high pressures if not protected by a by-pass valve connected between the suction and pressure sides of the pump. However, this pressure relief or by-pass valve is not of sufficient capacity to adequately relieve pressure from the pumping system if the pump is rotated at excessive speed. For example, if the by-pass valve is set to relieve pressures in excess of 50 pounds per square inch, which may be an average setting, it will relieve pressures in excess of 50 p.s.i., provided it is not rotated at a speed in excess of the manufacturer's rating, which is usually approximately 400 r.p.m. for these types of pumps. Pressures many times greater than 50 p.s.i., which will be incapable of being relieved to the proper degree, can be produced by the pump if this speed is exceeded, the pressure being dependent upon the rotational speed of the pump. Without the use of a tachometer, connected to the pump drive shaft, the tank truck operator has no way of knowing even approximately what the pump speed is when he operates the hand throttle to set the engine at pumping speed. Consequently, he may well be operating the pumping equipment at pressures sufficient to cause serious damage to the mechanisms. Also, disastrous pressures may be obtained if the operator forgets to disengage the power take-off after delivery and before driving the vehicle away.

These damaging high pressures have been found to cause cracking of the pump casting, collapse of the air release ball float mechanism, pump packing leaks, faulty metering of product, pipe joint leaks, etc. It is apparent from the above statements that in conventional operation of the pump and power take-off mechanism, the pressures created by the pump in the pumping system are basically dependent upon the rotational speed of the engine.

On the question of the damage to equipment caused by excessive pressure through careless high-speed setting of the hand throttle, it has been found that the invention disclosed in the Rowell Patent No. 2,634,681, dated April 14, 1953, and entitled "Pressure Responsive Throttle Control for Fluid Pumping Systems," has effectively reduced the occurrence of such damage by providing means which automatically sets the position of the engine throttle. However, with the device mentioned, the operator may inadvertently use the hand throttle and override the automatic throttle setting of the device. In all cases it may not be desirable to disconnect the hand throttle to prevent this occurrence.

Accordingly, it is the object of this invention to positively cut off the ignition of the engine when high pressures above a predetermined point exist in the pumping system regardless of the cause of such pressures, and thus instantly slowing the engine speed and limiting the maximum pressure to which the pumping system can be exposed.

While the above troubles set forth are not usually encountered with the individual tank truck owner and operator, they are prevalent with fleet operated vehicles, such as those of large independent and major oil companies who are faced with a highly seasonal employment situation requiring constant training of inexperienced personnel to operate their tank truck vehicles. Through inexperience, carelessness, or other causes, considerable costly damage may be done to the tank truck equipment from the causes as outlined herein. Therefore, it is a prime object of this invention to provide a device whereby damage to the vehicle pumping equipment, from the causes set forth, is prevented in an economical, practical, efficient and reliable manner.

The individual devices utilized in this invention are old and well-known but to my knowledge they have not been heretofore combined in the manner disclosed to produce the new result I obtain. In other words, my combination of old elements functions to produce a useful result in acting to stop an internal combustion engine in a novel manner upon the occurrence of a predetermined set of conditions. The action is non-reversible under certain adjustments of the parts: that is, it will stop the engine but not start it when the predetermined conditions are removed. Under other settings, the ignition will be periodically restored to keep the engine running but at a speed within the safe capacity of the pump.

In the drawings, Fig. 1 shows the invention in its entirety and Fig. 2 is an enlarged detail of the means for sealing the switch housing against possible leakage.

The drawing, Fig. 1, illustrates a conventional truck engine 1 with a transmission 2 adapted to drive a power take-off mechanism 3. The power take-off mechanism is arranged to be operatively engaged to the transmission by means of the power take-off lever 4 which when in operative position causes the pump drive shaft 5 to rotate when the engine is running. This causes the pump 6 (a positive displacement type pump is shown) to rotate and build up pressure in the pump and throughout the vehicle pumping system between the pump and the outlet. This pressure is limited to some extent, depending upon the rotational speed of the pump, by the pump bypass or relief valve 7. The by-pass valve 7 is usually fastened to the pump housing and through two parts, one entering into the suction side of the pump and the other entering into the discharge side of the pump, will relieve pressure from the discharge side of the pump through the by-pass valve 7 to the suction side of the pump. The by-pass valve 7 is further arranged to be selectively adjusted to open upon a predetermined pressure by means of an adjusting screw 8. Turning screw 8 into the valve 7 increases the internal spring pressure holding the valve closed and will thus require greater pressure to open the valve. The above means for controlling the pressure is well known and used throughout the industry wherever poistive displacement pumps are used on tank truck vehicles. The ability of the by-pass valve 7 to relieve pressure beyond its predetermined adjustment, usually about 45 to 50 lbs. per sq. in. will be dependent upon the rotational speed of the pump. If operated at speeds not exceeding the manufacturer's rating, it will control the excessive pressures within reasonable limits. If, however, the pump is rotated at speeds greater than those specified, the capacity of the by-pass valve 7 is exceeded and pressures destructive to the pumping equipment on the vehicle can be produced. If a centrifugal pump is used, it is customary to omit the bypass or pressure relief.

Branch connected to the pressure discharge conduit 10 is a hand shut-off valve 11 having an outlet connected to a pressure transmission conduit 12. The other end of the pressure transmission conduit 12 leads to a pressure responsive engine cut-off switch 13 contained in a leak-proof housing 14. A pressure responsive element 15 is contained within a lower housing 16 which housing is connected to the switch housing 14 by screws 17 and gaskets 18 and 19 to make a pressure-tight seal. See Fig. 2. The lower housing 16 is further characterized by having an internal passageway 20, one end of which leads to the pressure responsive element 15 and the other end to the pressure transmission conduit 12. Passageway 20 also contains a valve seat 21 arranged to selectively delay the action of the pressure sensitive element 15 by means of an adjustable valve 22, which snubs or delays the pressure passing between the valve 22 and the valve seat 21. If valve 22 is wide open, there will be no snubbing effect. As the valve 22 may be progressively closed, action of the element 15 under sudden pressure developed by the pump will be increasingly delayed. Within the pressure sensitive element 15 there is contained a spring 23 urging the pressure sensitive element 15 in one direction and the cut-off switch 13 in the opposite direction. Within the spring 23 there is a shaft 24 whose movement is controlled by the pressure sensitive element 15. Resting against one end of the shaft 24 is the switch-actuating button 25. The switch button 25, when depressed by upward movement of shaft 24, presses against the contact leaf spring 26 which causes a snap action of the spring 26 to take place. This moves contact 27 away from contact 29 until contact 27 engages contact 28.

As is usual with switches of this type, the snap action is due to changing the direction of the internal stress in the leaf spring 26. Normally, the stress in the leaf spring itself urges the spring 26 in one direction and application of pressure in the opposite direction, as caused by button 25, will cause it to snap in the other direction. When the pressure of shaft 24 is removed from button 25 the leaf spring will snap back to its normal position, opening contacts 27 and 28 and closing contacts 27 and 29.

Adjustment of the switch is provided by the pressure-adjusting screw 30. Movement of the screw 30 into the housing 14 will move the switch 13, pivoted at 31, downward by compressing spring 23 thus bringing button 25 closer to the leaf spring 26 which will cause the switch to operate on lower pressure. Moving the adjusting screw outward will cause switch 13 to pivot slightly counter-clockwise and thus greater pressure will be required to operate the switch due to greater amount shaft 24 must be moved upwardly before moving the button 25 sufficiently to press against the leaf spring 26. Spring 23 acts as explained to urge the switch 13 against the pressure-adjusting screw 30 at all times, but the spring 23 being only strong enough to support switch 13 against screw 30 has no appreciable effect in resisting the actuation of element 15 as the pressure applied to element 15 to compress it sufficiently to actuate the switch will be much in excess of the downward pressure of spring 23.

Other usual elements of a conventional ignition system have been illustrated in the drawing in order to more fully understand the relationship of the invention to the ignition system. These elements have been labeled and no further explanation is believed necessary except to point out that the wire A is connected, for convenience only, to the coil at point C. Wire A could with equal effectiveness be connected any place along the wire connecting the coil with the distributor or directly to the coil.

It has been found essential that for satisfactory operation the switch 13 have a large pressure differential, in the order of 30 lbs. or more. This differential is the difference in pressure between that required for the switch to operate and close contacts 27 and 28 and the pressure loss required to open contacts 27 and 28. This pressure differential may be incorporated in the switch or it may be adjustably provided in other ways, one of which would be to arrange contact 28 so that it could be adjustably moved further away from contact 27. For purposes of disclosure the switch 13 is considered to have a predetermined large differential of 30 lbs. or greater. This is necessary to prevent small changes of pressure from actuating the switch, as will be explained later.

Another necessary requirement is the adjustable provision disclosed by the snubbing valve 22. In order for the device to function properly it must differentiate between momentary high-shock pressures and sustained high pressures. For example, it has been found that momentary high-shock pressures exist in the pumping system when a control valve is suddenly closed. These pressures may reach well over 100 p.s.i. The engine cut-off switch 13 may be set to cut off at, for example, 70 lbs. continuous pressure as developed by too high pump speed and yet should not cut off at 100 lbs. momentary pressure developed by other than pump speed conditions. This provision is assured by means of the adjustable snubber valve 22 which effectively snubs out the momentary high-shock pressures before they can act upon the pressure element 15 sufficiently to actuate the switch 13.

Another necessary requirement is the provision of a pressure adjustment, as shown by adjusting screw 30, in order to satisfactorily function on the pressure encountered on a particular tank truck. Pressures will vary considerably from truck to truck, depending upon the pumping requirement of the truck and the capacity of the pumping system on that particular truck. Therefore, it is necessary to provide an adjustment to meet the various conditions encountered in the field.

Another necessary requirement, from a safety standpoint, is the means disclosed to prevent the inflammable product, carried in the pumping system under pressure, from flowing out to atmosphere in the event the pressure sensitive element 15 is ruptured. In the event breakage occurs in the element 15 the combustible fluid will be contained within the housing 14. This is accomplished, as shown in Fig. 2, by having gaskets 18 and 19 on both sides of the flange on the pressure element 15 and having the housing 14 pressure tight. As the device itself may be located in the vicinity of the engine, and the product in the tank truck may be gasoline, it is apparent that means should be provided to prevent a fire or explosion hazard from being created in the event of failure of the pressure element 15.

Still another necessary requirement is the provision of means, circuitwise, whereby the engine will be stopped upon reaching a predetermined high pressure in the system for a predetermined length of time and yet will not permit the engine to be automatically started when this pressure is relieved. Alternatively, if the predetermined high pressure that actuates the switch 13 to short circuit the ignition is quickly relieved as the engine slows down, then switch 13 will be reopened in time to restore the ignition before the engine has stopped rotating, whereupon the engine will resume operation to be subsequently cut off when the predetermined high pressure is again reached. The feature of stopping the engine completely is extremely desirable inasmuch as it makes operation of the tank vehicle engine impossible until the driver takes corrective measures to eliminate the condition which caused the high pressures. Such condition might be caused by leaving the power take-off engaged while attempting to drive the vehicle or by excessive speed of the engine while pumping. It is recognized that instead of temporarily disabling the engine, either permanently or intermittently the wire A could be connected to a visual or audible alarm, but this might be ineffective at those times when the driver is at the filling point of the customer's tank, or otherwise so far away that he might not be able to see or hear the alarm. It is believed that the more positive solution of the problem, namely, disabling the engine upon faulty operation by the driver is, for many reasons, the most effective as it will immediately and automatically function without manual supervision.

Operation

When the driver reaches the delivery point he usually leaves the engine running with the drive transmission in neutral. He then depresses the clutch pedal and moves the power take-off lever into the engaged position. Upon releasing the clutch pedal the pump drive shaft will rotate and drive the pump. The driver then pulls out the hand throttle until the engine reaches a speed that the driver estimates is approximately producing the correct rotational speed of the pump. If the pump is rotating within the limits recommended by the manufacturer, the pressure in the pumping system of the vehicle will equal approximately that of the pump by-pass valve setting, which may be 50 lbs. pressure. However, if the driver races the engine, causing the pump, positive displacement or centrifugal, to exceed its rated speed, extremely high pressures will be produced, depending upon the speed the pump is driven, and, in the case of the positive displacement pump the capacity of the by-pass valve will be exceeded. These pressures may be 150 lbs. or greater. With the pressure-limiting device of the invention this will be impossible due to the fact that as soon as switch 13 is operated by the pressure responsive means, a circuit will be closed from ground over wire B, through contacts 28 and 27 in switch 13, through wire A to the low-voltage terminal connection C on the distributor. This will effectively ground the distributor points and cause loss of ignition to the engine which will act to stop the engine if the excessive pressure is maintained for the necessary predetermined time, or if the pressure is quickly relieved by a sufficiently open setting of valve 22 or otherwise, ignition will alternately be restored and then broken again as the pressure again rises, thus holding the engine down to a safe maximum speed.

The engine if completely stopped will remain stopped until the driver operates the starting switch in the usual manner. If the driver has reduced his throttle setting below the limiting point of the cut-off switch, the engine after being restarted will continue running normally. However, if he has not reduced the throttle, the pressure will again build up and the engine will be automatically stopped or held to a reduced speed as explained above as before.

The device disclosed will function as readily on diesel-type engines merely by wiring switch 13 so that it cuts off the fuel supply to the engine when switch 13 is actuated.

Assuming now that the driver has completed his delivery, he will roll up the hose connected to the outlet of the pumping system, or otherwise take steps to prepare the vehicle for driving to the next stop. When the driver is finally ready to leave, he should enter the cab of the vehicle, disengage the power take-off, reelase the brakes, etc., before driving. However, if he should forget to disengage the power take-off before driving, the pump upon forward movement of the truck will rotate at excessive speeds and will place the pumping system under pressures greatly exceeding the maximum pressure rating of the various elements in the system. Damage to transmission, pump, meter, air release equipment, valves, hose, etc. can well take place. With the vehicle equipped with the invention disclosed, no damage can result because, within two or three seconds, after speeding up the engine in an attempt to drive the truck, the ignition will be interrupted and the engine will stop completely or slow down due to the action of the device as explained above.

The two or three second delay in operation is due to the action of the snubbing valve 22, as previously explained. The snubbing action produced by the valve is necessary for two purposes. One, as explained previously, it prevents the momentary high-shock pressures which exist in the system when a control valve is suddenly closed, from operating switch 13. Two, it provides time for the engine to come to a full stop before the switch 13 opens and removes the ground from the ignition points. When this snubbing action is not present as occurs when valve 22 is adjusted to open position, the pressure on bellows 15 will quickly decrease as the engine slows, switch 13 will open before the engine finally comes to rest, the engine flywheel preventing quick stopping, and the engine with spark plugs again functioning will run again. This off and on action will as explained above, then take place repetitively, and while it acts to limit the speed of the engine, the driver would still be able to drive the vehicle with the power take-off engaged, which is not desirable, but he would know at once that the pump was still engaged, requiring corrective action.

It is pointed out that even though the engine is stopped, due to the action of the cut-off switch 13, and the ignition key is "on," no burning of the points will take place because the ground through the switch 13 will by-pass current flowing through the ignition coil to the breaker points.

While I have shown one embodiment of the invention, it should be understood that changes and modifications may be resorted to in keeping with the spirit of the invention as defined by the appended claims.

I claim:

1. In a vehicle for transporting and dispensing fluids having a tank and an internal combustion engine for propelling said vehicle provided with an ignition system having a pair of make and break contacts in the primary circuit thereof, the combination comprising a power take-off mechanism, a fluid pump driven by said power take-off mechanism having the inlet thereof connected to said tank and the outlet thereof connected to a fluid discharge conduit, means for selectively actuating said power take-off mechanism by said engine, a pressure sensitive switch connected to said fluid discharge conduit and actuated by the discharge pressure of said pump to close its contacts, fluid flow control means positioned in the connection between said pressure sensitive switch and said fluid discharge conduit, means for adjusting said switch to vary the pressure operating range thereof, means electrically connecting said pressure sensitive switch in parallel to said make and break contacts, whereby during operation of said pump and predetermined continuance of a preselected pressure in said fluid discharge conduit, said pressure sensitive switch is actuated to short circuit said make and break contacts to interrupt the operation of said ignition system.

2. In the structure defined in claim 1, housing means for enclosing said pressure sensitive switch, which housing means also serves to support said fluid flow control means.

References Cited in the file of this patent

UNITED STATES PATENTS

| | | |
|---|---|---|
| 865,388 | Hill | Sept. 10, 1907 |
| 998,717 | Read | July 25, 1911 |
| 1,050,876 | Vaughn | Jan. 21, 1913 |
| 1,521,034 | Maxson | Dec. 30, 1924 |
| 1,529,693 | Dennis | Mar. 17, 1925 |
| 1,670,823 | Ramsden | May 22, 1928 |
| 1,686,883 | Taylor | Oct. 9, 1928 |
| 1,746,760 | Barlow | Feb. 11, 1930 |
| 1,770,264 | Eslinger | July 8, 1830 |
| 1,792,147 | Diescher | Feb. 10, 1931 |
| 2,086,869 | Herron | July 13, 1937 |
| 2,363,313 | Gavin | Nov. 21, 1944 |
| 2,373,902 | Matulaitis | Apr. 17, 1945 |
| 2,400,665 | Thomas | May 21, 1946 |
| 2,651,996 | Nahmens | Sept. 15, 1953 |
| 2,711,696 | Rowell | June 28, 1955 |
| 2,761,390 | Davidson | Sept. 4, 1956 |